United States Patent
Limbasia

(10) Patent No.: US 9,185,333 B2
(45) Date of Patent: Nov. 10, 2015

(54) METHOD AND SYSTEM FOR ACCESSING CONTENT FOR PRESENTATION VIA A SET-TOP BOX

(75) Inventor: Sunil Limbasia, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 597 days.

(21) Appl. No.: 11/949,587

(22) Filed: Dec. 3, 2007

(65) Prior Publication Data
US 2009/0144788 A1 Jun. 4, 2009

(51) Int. Cl.
| H04N 5/445 | (2011.01) |
| H04N 7/16 | (2011.01) |
| H04N 7/167 | (2011.01) |
| H04N 7/173 | (2011.01) |
| H04N 5/775 | (2006.01) |
| H04N 5/765 | (2006.01) |
| H04N 21/258 | (2011.01) |
| H04N 21/2668 | (2011.01) |
| H04N 21/482 | (2011.01) |
| H04N 21/61 | (2011.01) |
| H04N 21/462 | (2011.01) |

(52) U.S. Cl.
CPC ............... *H04N 5/775* (2013.01); *H04N 5/765* (2013.01); *H04N 7/17318* (2013.01); *H04N 21/25891* (2013.01); *H04N 21/2668* (2013.01); *H04N 21/4828* (2013.01); *H04N 21/6125* (2013.01); *H04N 21/4622* (2013.01)

(58) Field of Classification Search
CPC . H04N 21/4532; H04N 7/163; H04N 7/1675; H04N 5/44543; H04N 21/84; H04N 21/4622
USPC ......... 725/109, 40, 43, 45, 28, 30–31, 48–49; 386/46, 66; 709/223
See application file for complete search history.

(56) References Cited

U.S. PATENT DOCUMENTS

| 6,438,450 | B1 * | 8/2002 | DiLorenzo | 700/236 |
| 6,630,963 | B1 * | 10/2003 | Billmaier | 348/485 |
| 7,194,754 | B2 * | 3/2007 | Tomsen et al. | 725/60 |
| 7,559,073 | B2 * | 7/2009 | Marler et al. | 725/50 |
| 2006/0002681 | A1 * | 1/2006 | Spilo et al. | 386/46 |
| 2007/0271366 | A1 * | 11/2007 | Demers et al. | 709/223 |
| 2008/0168526 | A1 * | 7/2008 | Robbin et al. | 725/139 |

* cited by examiner

*Primary Examiner* — Nathan Flynn
*Assistant Examiner* — Sumaiya A Chowdhury

(57) ABSTRACT

An approach is provided for presenting, via a set-top box, a first media content to a user. The user is prompted with an option to experience a second media content relating to the first media content. The set-top box presents the second media content to the user upon selection of the option by the user.

19 Claims, 11 Drawing Sheets

METHOD AND SYSTEM FOR ACCESSING CONTENT FOR PRESENTATION VIA A SET-TOP BOX

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. Traditionally, broadcast media, being based on pre-computer age technology, has developed on its own path, without any regard to other media systems. With readily available, cost-effective broadband services, bandwidth intensive applications, such as audio and video streaming, have become viable medium. Unfortunately, little or no effort has been made to converge the two distinct paths.

Therefore, there is a need for an approach that seamlessly integrates traditional broadcast systems and broadband data networks for content delivery.

DESCRIPTION OF THE PREFERRED EMBODIMENT

A preferred apparatus, method, and software for providing, via set-top box, access to content over a data network are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio/video signals for presentation to a user, such as a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), and/or a personal computer (PC), as well as other like technologies and customer premises equipment (CPE).

Figure 1:
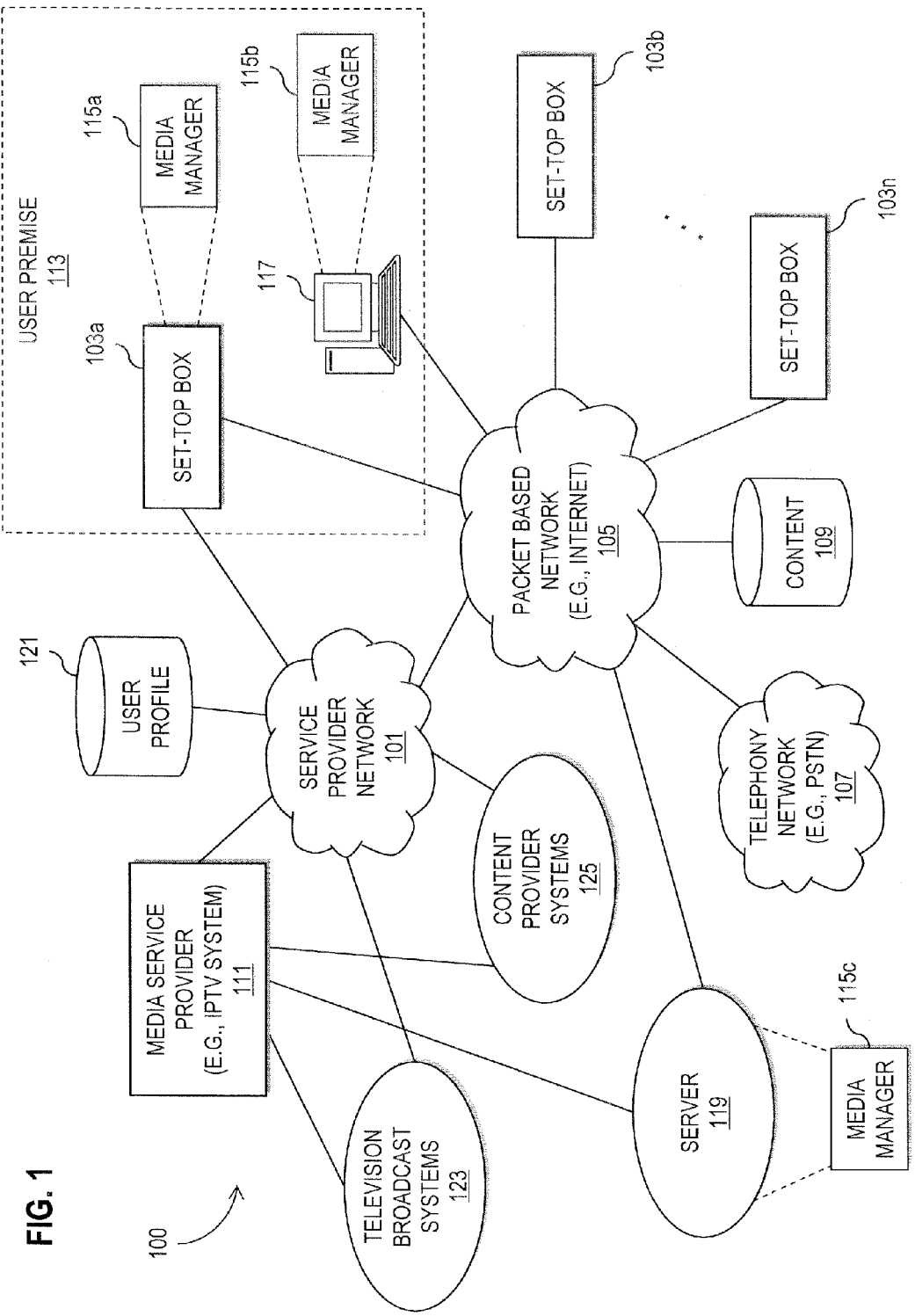
FIG. 1 is a diagram of a system capable of providing virtual channels of content accessible over a data network, according to an exemplary embodiment.

FIG. 1 is a diagram of a system capable of providing virtual channels of content accessible over a data network, according to an exemplary embodiment. A system 100 can be configured to permit convenience access to media content (e.g., audio, video, and/or photographic transmissions) that exists over a data network (e.g., the Internet) by a user of an STB (e.g., STB 103a). In this manner, a subscriber of this media access service may seamlessly "tune into" traditional IP-based media at, for example, a display device (not illustrated), such as a high definition television (HDTV) set. It is contemplated that system 100 may embody many forms and include multiple and/or alternative components and facilities.

It is observed that television remains the prevalent global medium for entertainment and information, as individuals spends a great deal of time tuning into televised media. Traditionally, in order to receive television and radio programming, consumers were generally limited to broadcast media sources, e.g., programs acquired "over-the-air" or via cable provider networks. However, users are continually being exposed to an ever increasing amount and variety of multimedia (e.g., audio, video, and photographic content) accessible over various delivery systems, such as data networks. Further, with the advent of the Internet and high-speed data connections, it is not uncommon for consumers to add to this body of available information by publishing libraries of end user originated content on, for instance, hosting sites, such as audio and video-sharing sites. In fact, the growing popularity of sharing content has given rise to entire industries permitting users to upload and make available "homemade" media via data networks and digital media devices. Not surprisingly, the consumer segment is driven, at least in part, by a pervasive desire for access to a wide possible array of content in an "on-demand" fashion.

For example, internet protocol television (IPTV) service providers are currently offering subscribers various video services ranging from multi-channel video programming that mimics traditional broadcast television, to true video-on-demand (VOD) programming. These services are further supplemented with interactive video applications that enable robust programming information, selection and navigation functionality, as well as integrated digital video recording, and data services to enhance the video experience. However, while IP stands for internet protocol, it does not actually mean the television content is streaming over the Internet. IP is simply the same protocol that enables Internet access. Even still, these shared protocols create integrated value propositions with regard to accessible content.

In this manner, consumers are becoming accustomed to the tool set of the Internet to "pull" customized content when desired, as apposed to receiving "pushed" content from linear broadcast sources. Thus, content providers must look to the synergistic characteristics of these two infrastructures to leverage upon the streaming services traditionally limited to data networks. In adopting these advancements, however, the media industry faces a number of challenges hindering the convergence of broadband rich data content (e.g., traditional IP-based content) with television infrastructures.

As such, fast "pipes" to these delivery systems have paved the way for new value-added services for conventional broadcast providers. Thus, the approach according to certain embodiments stems from the recognition that consumers may benefit from ability to experience, via STB, media content traditionally limited to the data domains. However, little attention has been afforded to extending and enhancing the dissemination of content within the entertainment arena, as well as among other commutations media. Thus, it is apparent that improvements are needed to provide consumers with the ability to experience any form of content they want, at any time they desire, using those devices designed to maximize the multimedia experience.

Service provider network 101 integrates the television medium with that of the telecommunications, computing, and media environments, thereby broadening the scope of devices and sources available to individuals for obtaining media content. In this manner, system 100 relieves network operators from the burden and expense of providing parallel avenues to content, by enabling users, via user equipment (e.g., STB 103*a*), to receive media content accessible over a data network (e.g., packet-based network 105). Although the user equipment is described with respect to an STB, it is contemplated that various embodiments have applicability to any device capable of processing audio and/or video streams.

In a typical scenario, an individual (e.g., a subscriber of the media access service) may establish a link between a data network source (e.g., content repository 109) and a media service provider (MSP) 111 to access content capable of being experienced at a user premise 113 via an STB (e.g., STB 103*a*). A media manager application (e.g., media manager 115*a*) permits users to easily, effectively, and intuitively locate and specify media content accessible over a data network 105. In other embodiments, one or more media manager applications 115*a*-115*c* may enable the media content to be retrieved over the data network, and presented to a user via STB (e.g., STB 103*a*).

Media content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the MSP 111 may provide (in addition to their own media content) content obtained from sources, such as one or more television broadcast systems 123, one or more third-party content provider systems 125, content residing in a repository 109 or accessible via server 119, as well as available via one or more packet-based networks 105 or telephony networks 107, etc.

MSP 111 can provide media content that is retrieved over the packet-based network 105, as well as provide conventional media streams. For instance, MSP 111 may provide access to content traditionally limited to host sites, such as end user originated content uploaded to audio, video, and/or pictographic sharing sites. Additionally, the media content include streamed audio and/or video from conventional broadcast providers.

It is noted that media content can be any type of information provided from any source having connectivity to system 100.

In this manner, media manger applications 115*a* and 115*b* may be executable, for example, as one or more user interfaces capable of local implementation on an STB (e.g., SB 103*a*-103*n*) or on an end terminal 117, such as a computer, telephony device, mobile device, or other like mechanism. Thus, exemplary embodiments of media manager applications 115*a* and 115*b* may be provided through navigation shell applications, e.g., menu applications having options corresponding to different functions. To this effect, computer devices may include desktop computers, notebook computers, servers, terminal workstations, gaming systems, customized hardware, or other equivalent apparatus. Telephony devices may comprise plain-old-telephones, wireless telephones, cellular telephones, satellite telephones, voice over internet protocol telephones, and the like. Mobile devices may include personal digital assistants (PDA), pocket personal computers, smart phones, tablets, handsets, portable gaming systems, and customized hardware, as well as other mobile technologies capable transmitting data. Moreover, STBs 103*a*-103*n* may be used alone or in combination with one or more end terminal(s) 117 to implement various exemplary embodiments.

The STBs 103*a*-103*n* and/or terminal 117 can communicate using the packet-based network 105 or the telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS® network, a TiVo® network, etc), and the like. Such networks may also utilize any suitable protocol supportive of data communications, e.g., transmission control protocols (TCP), internet protocols (IP), file transfer protocols (FTP), telnet, hypertext transfer protocols (HTTP), asynchronous transfer mode (ATM), socket connections, Ethernet, frame relay, and the like, to connect STBs 103*a*-103*n* to various sources of media content.

By way of example, STB 103*a*-103*n*, as well as terminal 117, can remotely access one or more servers (e.g., server 119), via a communication interface (not illustrated), configured to execute multiple instances of media manager application 115*c*. That is, media manager application 115*c* may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, server 119 can be an "online" system capable of communicating with one or more third-party web servers (not illustrated), content repositories (e.g., repository 109), or equivalent facilities, to provide users various avenues to locate, specify, receive, and/or share media content that is accessible over a data network (e.g., packet-based network 105). For example, exemplary embodiments of media manger application 115*c* may comprise hypertext markup language (HTML) user interfaces or JAVA™ applets stored on server 119 and accessed via world-wide-web pages. These interfaces are particularly useful in extending system 100 functionality to devices having limited resources (e.g., PDAs, handsets, thin-clients, etc.). In alternative embodiments, server 119 is collocated with and/or integrated into MSP 111.

As such, multiple users, interfaces, and instances of media manager application 115c can be simultaneously realized through system 100.

In the example of FIG. 1, STBs 103a-103n are located at one or more user premises (e.g., user premise 113), and geospatially associated with one or more regions. STBs 103a-103n may be configured to communicate with and receive signals and/or data streams from a MSP 111 (or other transmission facility) in response to processes of one or more media manager application(s) 115a-115c. These signals include media content retrieved over a data network (e.g., service provider network 101, packet-based network 105, and/or telephony network 107), as well as conventional video broadcast content.

MSP 111 can include one or more media content servers (not illustrated) and/or data repositories (not shown). Alternatively, user profile repository 121, content repository 109, or server 119 may be accessed via one or more service provider networks 101 and/or packet-based networks 109. Further, service provider network 101 may include a system administrator (not shown) for operational and management functions to deploy the media access service using, for instance, an internet protocol television (IPTV) system. In this manner, STBs 103a-103n can utilize any suitable technology to draw, receive, and/or transmit media content from/to an MSP 111 or other content source/sink. A more detailed explanation of an exemplary STB is provided with respect to FIG. 2.

In an exemplary embodiment, STBs 103a-103n can draw, receive, and/or transmit content from (or to) multiple sources, thereby alleviating the burden on any single source, e.g., MSP 111, to gather, supply, or otherwise meet the content demands of any user or premise. Thus, particular embodiments enable authenticated third-party television broadcast systems 123, third-party content provider systems 125, and servers (e.g., server 119) to transmit media content accessible over a data network to STBs 103a-103n either apart from, or in conjunction with, MSP 111. Such media content may include media regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

The media content may be distinguished (or otherwise categorized) utilizing metadata included therewith or appended thereto. Metadata can be generally considered data about data; but more specifically, it can be utilized to describe all aspects of, and media content distributed by, system 100. Namely, metadata can include descriptions about: data aspects (file name, type, administrator, size, location, version, or include timestamps, mode bits, arbitrary attribute-value pairs, etc.), titles, activities/events, individuals and organizations involved, intended audiences (e.g., ethnicities, ages, genders, incomes, educational levels, disabilities, mobilities, as well as other like demographic statistics), geospatial identifications (intended zip codes, school districts, communities, etc.), locations of supplementary information and processes, access methods, limitations, timing of activities/events (e.g., start/end dates), as well as motivations, policies and rules. As such, metadata may be utilized by various components of system 100 for control or guiding purposes.

In particular embodiments, system 100 may structure and encode metadata to describe characteristics of the content-bearing entities to aid in the identification, discovery, assessment, and management of the media content by media manager application 115a-115c. For example, the metadata can be used to optimize compression algorithms or perform other computational tasks by the components of system 100. The metadata might be utilized to share media content among a plurality of STBs 103a-103n. Various other embodiments might use metadata to suggest media content sources of interest to a user based on information stored in a user profile. A more detailed explanation of user profiles is provided with respect to FIG. 2.

In various embodiments, the service provider network 101 may include one or more video and/or audio processing modules (not shown) for acquiring and transmitting content feeds (including media content accessible over a data network) from MSP 111, the television broadcast systems 123, the third-party content provider systems 125, or servers 119 over one or more of the networks 101, 105, 107, to particular STBs 103a-103n. Further, service provider network 101 can optionally support end-to-end data encryption in conjunction with media content streaming services such that only authorized users are able to experience content and interact with other legitimate users/sources.

Accordingly, system 100 may include an authentication module (not shown) configured to perform authentication services and determine whether users or content sources are indeed subscribers to, or providers of, the media access service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., media content streaming instances). Data packets, such as cookies, may be utilized for this purpose. Thus, once an STB or content source is authenticated, connections between the STBs 103a-103n and the content sources may be established directly or through MSP 111.

In other embodiments, authentication procedures on a first device (e.g., STB 103a) may identify and authenticate a second device (e.g., terminal 117) communicatively coupled to, or associated with, the first device. Further, the authentication module may grant users the right to receive media content from multiple system 100 sources by revoking existing sets of digital certificates associated with a particular provider, and issuing new sets of digital certificates mapped to a second provider. In this regard, an STB (e.g., STB 103a) may receive new media content from a second source, whereas the previous session may be automatically closed when the "old" or prior certificates associated with the first source are revoked. This enables users to initiate secure sessions at any given STB 103a-103n (or end terminal 117) linked to system 100, whether or not the STB (or end terminal) belongs to that individual user. It is additionally contemplated that multiple rights sessions may exist concurrently.

In particular embodiments, MSP 111 may comprise an IPTV system configured to support the transmission of television video programs from the broadcast systems 123 as well as other content, such as media content from the various third-party sources (e.g., 109, 119, 123, 125) utilizing internet protocol (IP). That is, the IPTV system 111 may deliver signals and/or streams, including media content accessible over a data network, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of media content (including content accessible over data networks). Delivery of video content, by way of example, may be through a multicast from the IPTV system 111 to the STBs 103a-103n. Any individual STB may tune to a particular source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as cable, may still be utilized. It is noted that conventional delivery methods may also be implemented and combined with the advanced methods of system 100. Further, the media content may be provided to various IP-enabled devices, such as those computing, telephony, and mobile apparatuses previously delineated.

An STB (e.g., STB 103a) may integrate all the functions of an IPTV system, as well as combine the media content functions of the various online or off-line environments, in a manner that seamlessly toggles among the various system 100 resources. It is contemplated that the media access service may be extended to users with a presence on the Internet. In alternative embodiments, the services of system 100 could be extended to users having an end terminal (not shown), such as a plain old telephone service (POTS) device, connected to the telephony network 111. While system 100 is illustrated in FIG. 1, the exemplary components are not intended to be limiting, and indeed, additional or alternative components and/or implementations may be utilized.

Figure 2:
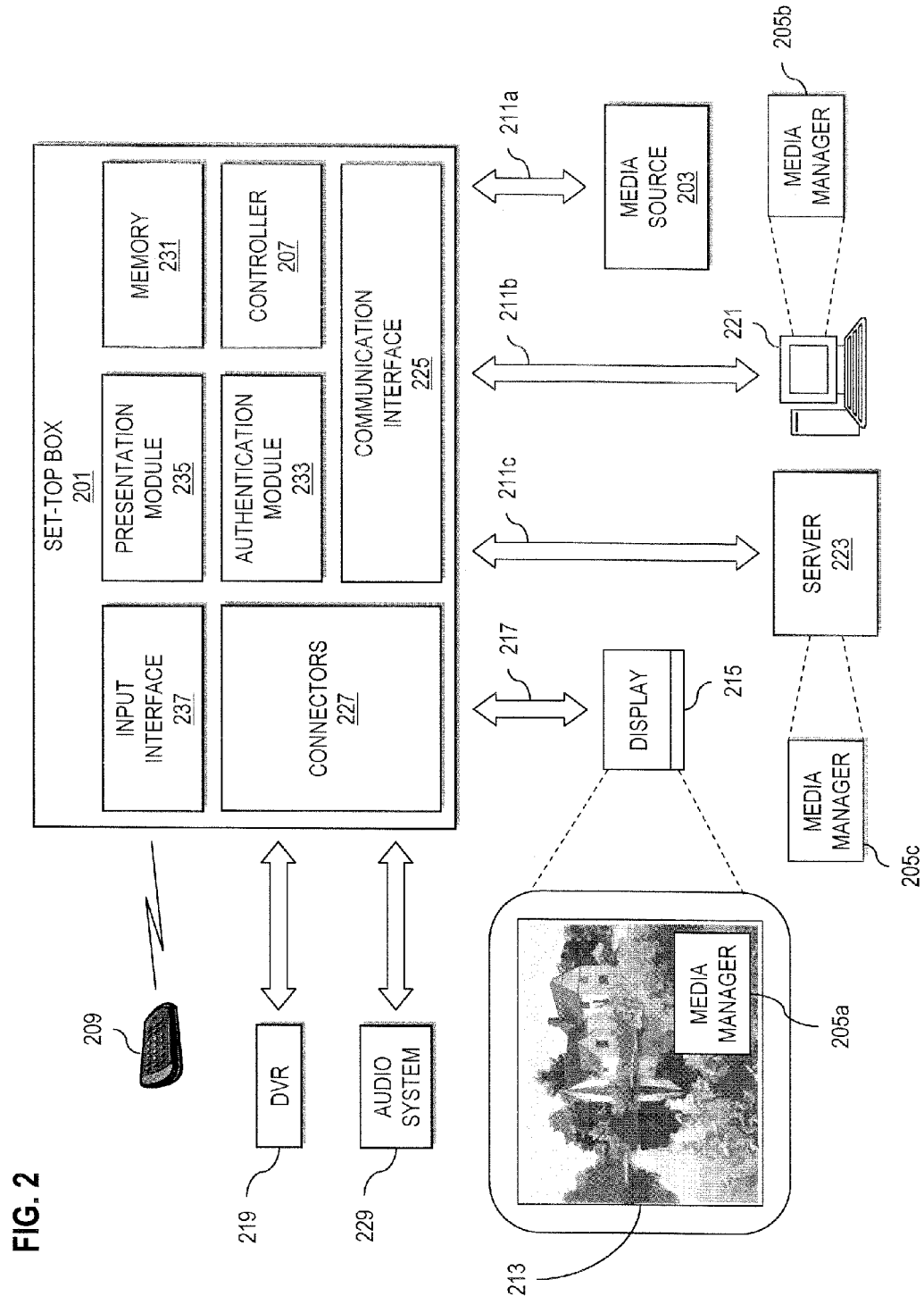
FIG. 2 is a diagram of a set-top box configured to provide access to media content, according to an exemplary embodiment.

FIG. 2 is a diagram of a set-top box configured to provide media content, according to an exemplary embodiment. STB 201 may comprise any suitable technology to receive one or more content streams from a media source 203, such as the IPTV system of FIG. 1. The content streams include media content retrieved over a data network, in response to commands from one or more media manager application(s) 205a-205c, for presentation via STB 201.

Accordingly STB 201 may comprise computing hardware (such as described with respect to FIG. 8) and include additional components configured to provide specialized services related to the reception and display of media content (e.g., remote control capabilities, conditional access functions, tuning functions, presentation functions, multiple network interfaces, audio/video signal ports, etc.). Alternatively, the functions and operations of STB 201 may be governed by a controller 207 that interacts with each of the STB components to provide media content retrieved from an audio or video-sharing site, as well as from another STB device or component of system 100. In turn, a user may be afforded greater functionality utilizing a control device 209 to control these services, as will be more fully described below.

As such, STB 201 may be configured to process a content stream (e.g., streams 211a-211c), including causing a media manger application 205a and/or one or more components of the media content (e.g., video component 213 and/or an audio component) to be presented on (or at) display 215. Presentation of the media content may include: displaying, recording, playing, rewinding, forwarding, toggling, selecting, zooming, or any other processing technique that enables users to experience content streams 211a-211c. For instance, STB 201 may provide one or more signals 217 to a display 215 (e.g., television) so that the display 215 may present (e.g., display) the media manager application 205a overlaid on the media content (e.g., video 213) to a user, wherein the media content includes content retrieved over a data network.

STB 201 may also interact with a PVR, such as digital video recorder (DVR) 219, to store received signals that can then be manipulated by a user at a later point in time. In various embodiments, DVR 219 may be network-based, e.g., included as a part of the service provider network 101, collocated at a subscriber site having connectivity to STB 201, and/or integrated into STB 201. A display 215 may present content provided via STB 201 to a user. In alternative embodiments, STB 201 may be configured to communicate with a number of additional peripheral devices, including: a PC 221, laptops, PDAs, cellular phones, monitors, mobile devices, handheld devices, as well as any other equivalent technology capable of presenting content to a user, such as those computing, telephony, and mobile apparatuses described with respect to FIG. 1.

These peripherals may be configured to implement instances of a media manager application (e.g., media manager application 205b) to access content stored and/or processed by STB 201. For example, a media content stream 21a may be received by STB 201 and recorded by DVR 219, wherein PC 221 may later access and view the stored content. Moreover, the peripheral devices may be configured to program or otherwise control the functions of STE 201. For instance, a media manager application 205b executed on PC 221 may receive input from a user specifying media content that is accessible over a data network. A communication interface (not illustrated) of PC 221 may be configured to retrieve the media content over the data network (e.g., packet-based network 105), wherein STB 201 may receive a media content stream 211b from PC 221 to present to the user via display 215.

In another embodiment, user input to STB 201 and/or a peripheral device (e.g., PC 221) executing an instance of a media manager application (e.g., media manager application 205a and/or 205b) may cause specified media content to be made available at another STB (e.g., STB 103b-103n) or a computing, telephony, or mobile device capable of processing audio and/or video streams. Additionally, user input to a network-based media manager application 115c, implemented on, for instance, server 223, may be configured to program or otherwise control the functions of STB 201. For instance, a user may access media manager application 115c via an end terminal 117 (e.g., PC 221, a mobile handset, etc.), over one or more data networks (e.g., network 101, 105, and/or 107), to locate, specify, share, and/or transmit media content to STB 201. In this manner, server 221 (or other component of system 100, such as MSP 111) may, when suitable, transmit specified media content as stream 211c to STB 201 for presentation at display 215.

Furthermore, STB 201 may include a communication interface 225 configured to receive content streams from an MSP 111, PC 221, sever 223, or other media content source, such as media source 203. Communication interface 225 may optionally include single or multiple port interfaces. For example, STB 201 may establish a broadband connection to multiple sources transmitting content to STB 201 via a single port, whereas in alternative embodiments, multiple ports may be assigned to the one or more sources. In still other embodiments, communication interface 225 may be configured to permit users, via STB 201, to transmit data (including media content) to other users with STBs, an MSP 111, or other content source/sink.

According to various embodiments, STB 201 may also include inputs/outputs (e.g., connectors 227) to display 215 and DVR 219, as well as an audio system 229. In particular, audio system 229 may comprise a conventional audio-video receiver capable of monaural or stereo sound, as well as multichannel surround sound. Audio system 229 may include speakers, ear buds, headphones, or any other suitable component configured for personal or public dissemination. As such, STB 201, display 215, DVR 219, and audio system 229, for example, may support high resolution audio and/or video streams, such as high definition television (HDTV) or digital theater systems high definition (DTS-HD) audio. Thus, STB 201 may be configured to encapsulate data into a proper format with required credentials before transmitting onto one or more of the networks of FIG. 1 and de-encapsulate incoming traffic to dispatch data to display 215 and/or audio system 229.

In an exemplary embodiment, display 215 and/or audio system 229 may be configured with internet protocol (IP) capability (i.e., includes an IP stack, or is otherwise network addressable), such that the functions of STB 201 may be assumed by display 215 and/or audio system 229. In this manner, an IP ready, HDTV display or DTS-HD audio system may be directly connected to one or more service provider networks 101, packet-based networks 109, and/or telephony networks 111. Although STB 201, display 215, DVR 219, and audio system 229 are shown separately, it is contemplated that these components may be integrated into a single component, or other combination of components.

An authentication module 233 may be provided at STB 201 to initiate or respond to authentication schemes of, for instance, service provider network 101 or various other content providers, e.g., broadcast television systems 123, third-party content provider systems 125, or servers 119. Authentication module 233 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 201 may identify and authenticate a second device (e.g., PC 221) communicatively coupled to, or associated with, STB 201, or vice versa. Further, authentication information may be stored locally at memory 231, in a repository (not shown) connected to STB 201, or at a remote repository, e.g., user profile repository 121.

Authentication module 233 may also facilitate the reception of data from single or disparate sources. For instance, STB 201 may receive broadcast video from a first source (e.g., IPTV system 111), signals from a media manager application at second source (e.g., server 119), and a media content stream from a third source accessible over a data network (e.g., content repository 109). As such, display 215 may present the broadcast video, media manager application, and media content stream to the user, wherein STB 201 (in conjunction with one or more media manager application(s) 205a-205c) can permit users to experience various sources of media content traditionally limited to the data domains. This presentation may be experienced separately, concurrently, in a toggled fashion, or with zooming, maximizing, minimizing, or trick capabilities, or equivalent mode. In other exemplary embodiments, authentication module 233 can authenticate a user to allow them to specify media content that is to be presented to other STBs (e.g., STB 103a-103n).

A presentation module 235 may be configured to receive data streams 211a-211c (e.g., audio/video feed(s) including media content retrieved over a data network) and output a result via one or more connectors 227 to display 215 and/or audio system 229. In this manner, presentation module 235 may also provide a user interface for media manager application 205a via display 215. Aural aspects of media manager application 205a may be presented via audio system 229 and/or display 215. In certain embodiments, media manager application 205a may be overlaid on the video content output 213 of display 215 via presentation module 235.

In any case, however, the data streams may include content received in response to user input specifying media content that is accessible over a data network (e.g., packet-based network 105, etc.), wherein the content is retrieved from an audio and/or video sharing site. Accordingly, presentation module 235 may provide a list of identifiers to the user for selection of media content to be experienced. Exemplary identifiers may include graphical elements, channels, aural notices, or any other suitable signifier, such as a uniform resource locator (URL), phone number, serial number, registration number, MAC address, code, etc.

Connector(s) 227 may provide various physical interfaces to display 215, audio system 229, as well as other peripherals; the physical interfaces may include, for example, RJ45, RJ11, high definition multimedia interface (HDMI), optical, coax, FireWire, wireless, and universal serial bus (USB), or any other suitable connector. The presentation module 235 may also interact with a control device 209 for determining particular media content that a user desires to experience. In an exemplary embodiment, the control device 209 may comprise a remote control (or other access device having control capability, such as a PC 221, wireless device, mobile phone, etc.) that provides a user with the ability to readily manipulate and dynamically change parameters affecting the media content being viewed. In other examples, STB 201 may be configured for voice recognition such that STB 201 may be controlled with spoken utterances.

In this manner, control device 209 may include (not shown) a cursor controller, trackball, touch screen, touch pad, keyboard, and/or a key pad for activating media manager application 205a, navigating through broadcast channels and/or media content identifiers, as well as performing other control functions. For instance, control device 209 may be utilized to maximize a media manager application, navigate through displayable interfaces, locate/specify/retrieve media content, modify STB 201 parameters, or toggle through broadcast channels and/or media content identifiers. Control device 209 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 209 may comprise a memory (not illustrated) for storing preferences affecting the media content viewed, which can be conveyed to STB 201 through an input interface 237. The input interface 237 may support any type of wired and/or wireless link, e.g., infrared, radio frequency (RF), BLUETOOTH, and the like. Thus, control device 209 may store user preferences with respect to media content, such as favorite sources, etc. Alternatively, user preferences may be tracked, recorded, or stored in STB 201 or in a network user profile repository 121. The preferences may be automatically retrieved and activated by a user at any time. It is noted that the control device 209 may be separate from STB 201 or may be integrated within STB 201 (in which case certain input interface hardware and/or software may not be necessary).

Particular embodiments enable users, via control device 209, to populate or otherwise configure a user profile. For instance, a user profile application may be provided or accessed by STB 201 to enable users to populate a plurality of entry fields with user information. A user profile may include one or more customized or personalized settings that affect any aspect of media content accessible via STB 201. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible media content sources/subjects, a "blacklist" specifying one or more media content sources/subjects, as well as other equivalent customized settings, such as color schemes, sound effects, etc.

In other embodiments, the user profile may be established using the additional access devices described earlier, e.g., end terminal 117, such as PC 221. As such, user profile information may be stored in STB 201, e.g., in memory 231, and/or at a user site repository (not illustrated) directly connected to STB 201. Additionally or alternatively, profile information may be stored in a network-based repository (e.g., remote user profile repository 121), control device 209, and/or any other storage medium. Similarly, STB 201 (via memory 231), a user site repository, and/or a network-based repository may store a "MY CONTENT" collection of digital audio, video and/or pictographic content accumulated by a user. This collection may also include a plurality of identifiers (or bookmarks) to media content accessible over a data network, wherein the selection of a particular identifier may cause one or more media manager applications 205a-205c to obtain the content from an associated link (either directly from a data network source (e.g., content repository 109) or indirectly from server 119 and/or MSP 111).

Thus, under arrangements of FIGS. 1 and 2, a user may experience (e.g., locate, specify, and receive), as well as share (e.g., transmit) media content including content retrieved over a data network (e.g., packet-based network 105). The operation of STB 201 and one or more media manager applications 205a-205c, in conjunction with the components of system 100, will now be described with respect to experiencing and sharing media content retrieved over a data network.

Figure 3:
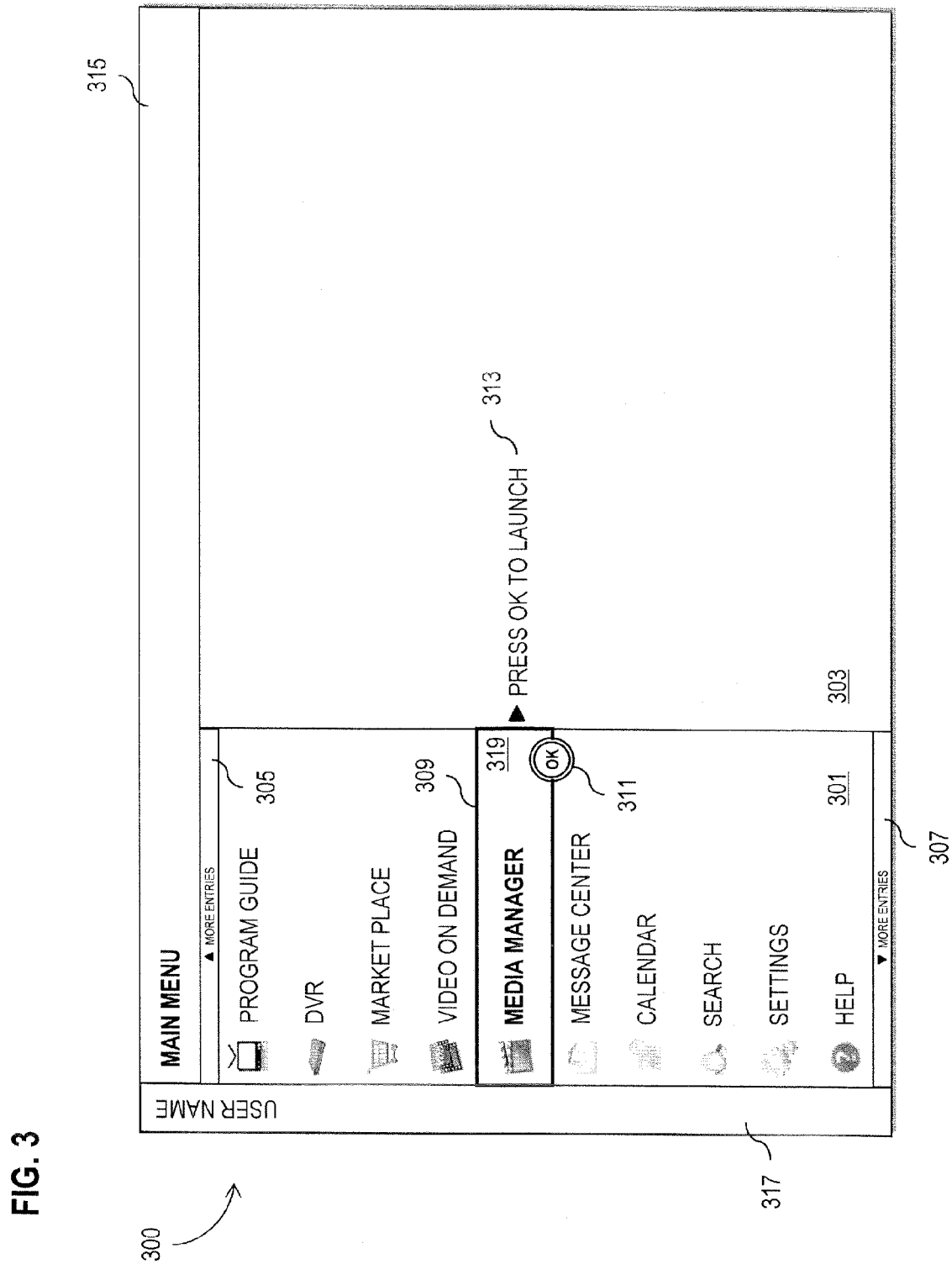
FIG. 3 is a diagram of a main menu user interface of the set-top box of FIG. 2, according to an exemplary embodiment.

As there may be a relatively large number of media content sources and even more media content instances available to users, STB 201 may include a user interface configured to allow users to seamlessly access the functions of STB 201, the available media content, and one or more of the media manager applications 205a-205c. It is recognized; however, that the user interface may be implemented at one or more end terminals 117 (e.g., PC 221) or accessible via server 119 or MSP 111. Thus, the user interface may be displayed to the user as part of a media manager application accessed over a suitable communications link. Namely, web pages may be displayed to the user as part of an online media manager application accessed over an Internet communications link. Accordingly, FIG. 3 is a diagram of a main menu user interface of the set-top box of FIG. 2, according to an exemplary embodiment.

The main menu 300 interface may be evoked using a number of different methods. For example, the user may select a dedicated "MENU" button on control device 209 or a peripheral device communicatively coupled thereto (e.g., PC 221, a mobile handset, etc.). It is recognized that any other suitable actuator of these devices may be additionally, or alternatively, used to access the functionality of main menu 300, such as triggering a "GUIDE" icon. Further, main menu 300 may be evoked by selecting an option within another interface or application (e.g., when navigating from a public screen to a user-specific screen, i.e., a private screen). As such, an executing device (e.g., STB 201, PC 221, etc.) may require sufficient authentication information (e.g., username and password, etc.) to be input in order to access the functions of main menu 300.

As shown, interface (or screen) 300, providing a "Main Menu," may include one or more interactive viewing panes, such as panes 301 and 303. In particular embodiments, as will be described in more detail below, the content of pane 303 may be dynamically updated to display various information related to actions conducted within pane 301, and vice versa. Pane 301 includes a listing of selectable entries corresponding to one or more features (or options) that may be provided via STB 201. For example, entries might include: program guide listings, DVR options, marketplace (shopping) options, on demand programming options, media manager features, messaging and communications features, searching options, settings, help features, and the like. In certain embodiments, graphical elements may be provided to correspond to one or more of the entries, and may be displayed therewith.

Header 305 and footer 307 fields may be provided and configured to indicate the existence of additional entries not displayed, but navigably available. Accordingly, users may browse through these entries via, for instance, control device 209. A fixed focus state (e.g., border 309) and/or distinctive magnification features, e.g., color, brightness, bolding, font type, text size, etc., may be used to convey a "currently" navigated position. In this manner, when a user navigates to a desired entry, actuation of, for instance, an "OK" button on control device 209 may launch corresponding features and/or applications of the particular entry. In some embodiments, an interactive "OK" option 311 may be utilized. Moreover, main menu 300 may include tooltips (e.g., tooltip 313) when a user navigates to a particular entry. In other embodiments, an aural description of the entry navigated to and methods of interaction may be provided.

In other embodiments, main menu 300 may provide navigation fields 315 and 317 to facilitate usability. For example, field 315 may provide the name of the function/option being accessed, e.g., "MAIN MENU." In this manner, when a user accesses a new function/option, field 315 is automatically updated, as is apparent in, for example, FIG. 5a. Field 317 may be utilized to indicate the user profile currently authenticated to system 100, e.g., "USER NAME." Additional functionality of field 317 is described with respect to FIGS. 5a and 5b. Thus, a user may access a media manager application (e.g., media manager application 205a) by navigating to and selecting entry 319 of main menu 300.

Figure 4B:
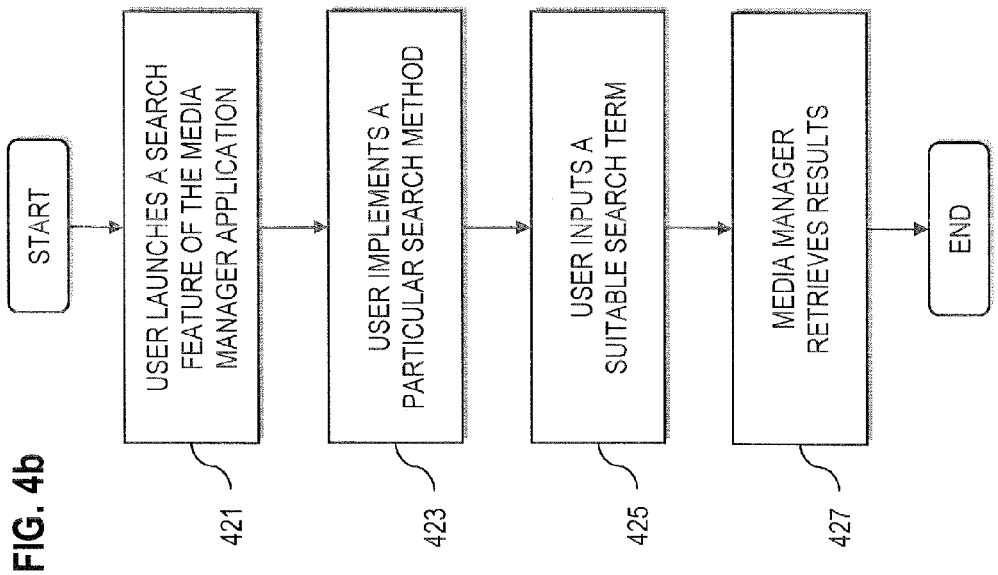
FIGS. 4a and 4b are flowcharts of processes performing content searches, according to various embodiments.
Figure 4A:
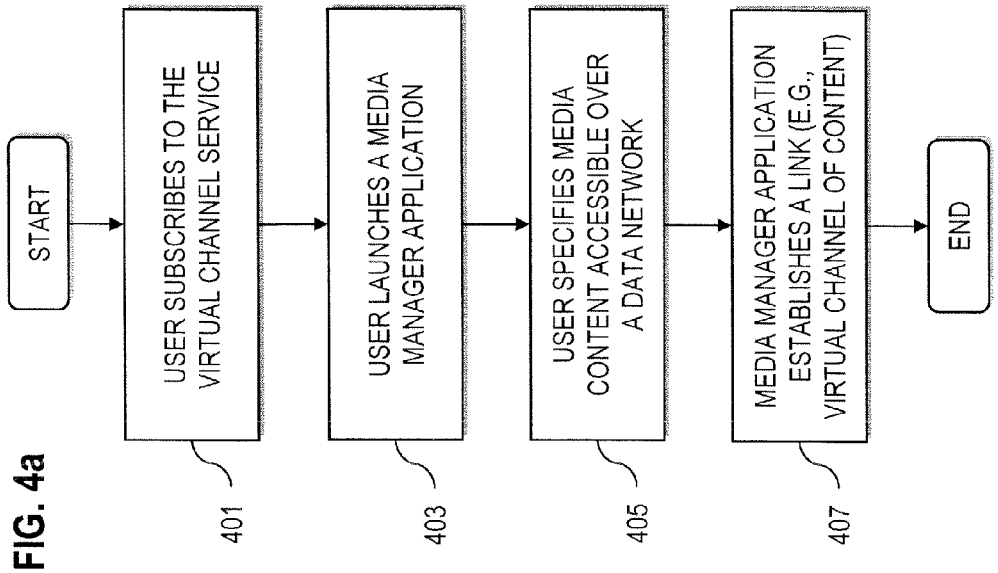

In some embodiments, one or more media manager applications 205a-205c may be utilized to specify and search for media content accessible over a data network that is to be presented to a user via STB 201. FIGS. 4a and 4b are flowcharts of processes for specifying and searching for content, according to various embodiments. The processes of FIGS. 4a and 4b will be described in conjunction with FIGS. 5a and 5b, respectively.

Figure 5A:
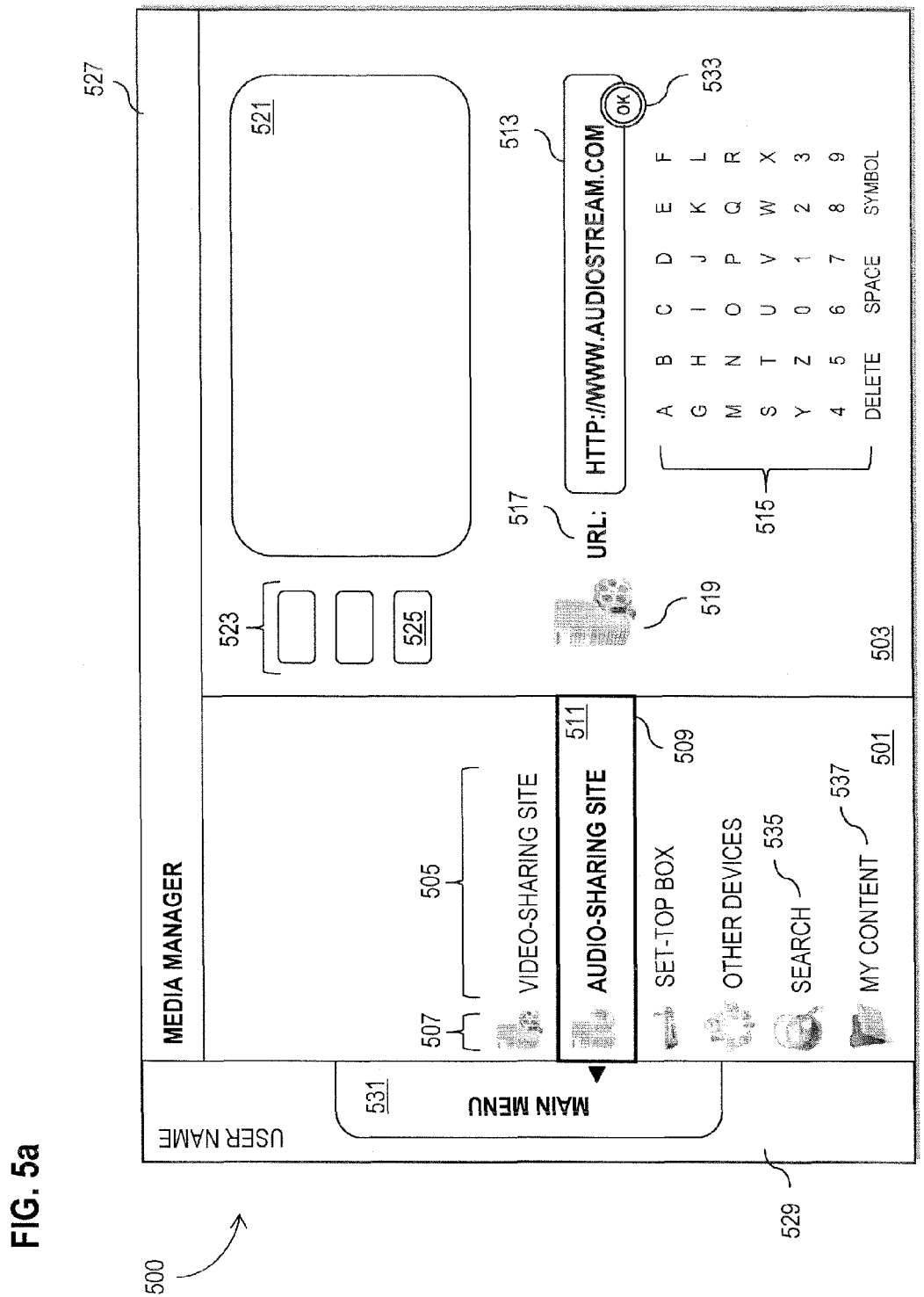
FIGS. 5a and 5b are diagrams of user interfaces utilized in the processes of FIGS. 4a and 4b, according to exemplary embodiments.

In particular, FIG. 4a shows a process for specifying media content accessible over a data network to make available via set-top box, according to an exemplary embodiment. FIG. 5a is a diagram of an exemplary user interface configured for this purpose.

At step 401, a new user subscribes to the media access service utilizing, for instance, STB 201 (which is capable of processing audio and/or video channels/streams). That is, the user may interact with STB 201 using control device 209 to activate software resident on STB 201, such as media manager application 205a. The software may then establish one or more connections to service provider network 101 through an IP-based connection. Consequently, the user may register as a new subscriber of the media access service, as well as obtain sufficient authentication information for establishing future sessions.

In certain embodiments, registration procedures may prompt the user to identify all user devices (e.g., STB 201 and/or end terminals 117) that the user may employ to interact with system 100 features, e.g., media manager applications 205a-205c. The software may automatically search for peripheral devices, e.g. through a pinging or other suitable procedure. In other embodiments, the user may identify devices by entering appropriate device information, such as: device type, serial number, registration number, MAC address, phone number, communications link, etc. Further, when a new device is employed, the software may add the apparatus to the list of user devices associated with the user's account.

Once registered and/or authenticated, STB 201 may establish communication with MSP 111 for customizing a user profile to embody user-defined attributes or policies for carrying out functions of system 100. Thus, when the user authenticates a presence via, for instance, STB 201, the software may provide user-specific interfaces and features based on information stored within the user profile. Moreover, authentication procedures at one device (e.g., PC 221) may authenticate other devices (e.g., STB 201), as previously described.

After generating a user profile, MSP 111 may store a list of subscribers to the service, as well as a list of subscriber STB identifiers, authentication information, and user-defined profiles. In step 403, the subscriber may interact with, for instance, STB 201 via control device 209, to launch a media manager application (e.g., media manager application 205a). In one embodiment, the application may be launched from the main menu 300 interface. Other embodiments enable users to execute remote media manager applications (e.g., media manager applications 205b and 205c) that may interact with STB 201. At step 405, media manager application may receive user input. For example, a user may specify media content accessible over a data network to be made available via STB 201.

As seen in FIG. 5a, a user may directly enter information identifying particular media content via interface 500. More specifically, interface 500 may comprise panes of a media manager application, e.g., media manager application 205a. As previously described with respect to main menu 300, interface 500 may include one or more interactive viewing panes 501 and 503 having displays that may be dynamically altered in response to user interaction. Pane 501 may include a list 505 of navigably selectable entries permitting various modes of identifying particular media content, such as audio-sharing site modes, video-sharing site modes, set-top box identifying modes, or other device/source identifying modes. In certain embodiments, a plurality of graphical elements 507 may be provided to correspond to one or more of the entries, and may be displayed therewith. Other selectable entries include search options and my content options that will be described in more detail with respect to FIGS. 4b and 5b-7b.

Accordingly, users may browse through these entries via, for instance, control device 209. A fixed focus state (e.g., border 509) and/or distinctive magnification features may be used to convey a "currently" navigated position. In this manner, when a user navigates to a desired entry, the display of pane 503 may toggle between corresponding methods of input. For instance, when a user navigates to entry 511, media content from an audio-sharing site accessible over a data network (e.g., packet-based network 105), such as a video stream, may be specified (e.g., as seen in pane 503). As such, particular content instances may be identified by a URL, a uniform resource name (URN), a compact uniform resource identifier (CURIE), an extensible resource identifier (XRI), an internationalized resource identifier (IRI), or other suitable address, such as a namespace identifier. In alternative embodiments, identifiers may include path variables, IP addresses, MAC addresses, phone numbers, serial numbers, registration numbers, buddy names, etc., as well as combinations thereof.

Users may input identifier information in box 513 via, for instance, a key pad of control device 209 or an on-screen keyboard (e.g., keyboard 515). Field 517 may be provided as a drop-down list for users to choose between the aforementioned addressing methods. Further, a graphical element 519 may be provided as a reminder of the source type to be input. In this regard, a window 521 may be provided and configured to include listings of media content identifiers previously input, shared from other STBs, recommended by MSP 111, etc. Users may toggle between these listings using a plurality of interactive buttons 523. For instance, interaction with button 525 may cause recommended video streams to be displayed based on previously experienced content or information stored within a user profile. As such, identifiers from the lists may be selected from and automatically input to box 513 to facilitate input efficiencies.

As with main menu 300, navigation fields 527 and 529 may be provided to facilitate usability. In the depicted embodiment, field 527 provides the name of the function/option being accessed, e.g., "MEDIA MANAGER." Meanwhile, field 529 includes tab 531 indicating a browsing path or thread created by the user during a particular session. Tab 531 may be labeled and made selectable so that the user can easily return to a particular function within the history without having to restart a session. In alternative embodiments, users may navigate session histories via "BACK" and "FORWARD" buttons of control device 209. Furthermore, field 529 indicates a user profile of the current session, e.g., "USER NAME."

Thus, a user may specify media content that is accessible over a data network (via box 513) by inputting an address (e.g., URL) of the content. Referring back to FIG. 4a, when a user interacts with an "OK" option 533 (or button of control device 209, etc.) the media manager application (per step 407) establishes a link between the specified source (e.g., "HTTP://AUDIOSTREAM.COM") and, for instance, MSP 111. In alternative embodiments the link may be established directly to STB 201 or other peripheral device. Once the link is established, a media manager application may provide an identifier of the media content in a "MY CONTENTS" feature/option. Processes for selecting and experiencing specified media content will be more fully described with respect to FIGS. 6-7b.

Figure 5B:
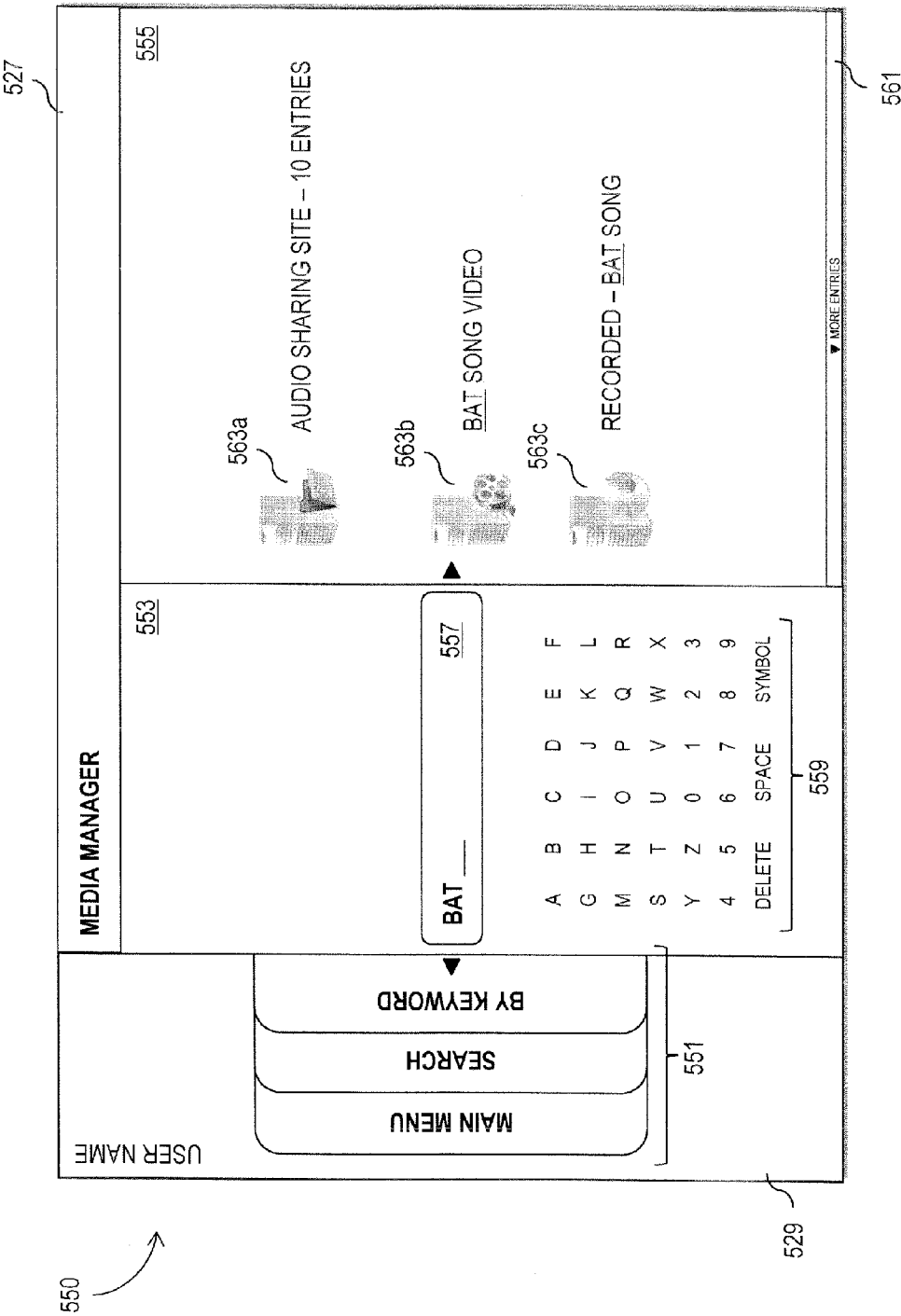

FIG. 4b is a flowchart of a process to search for media content, according to an exemplary embodiment. FIG. 5b is a diagram of an exemplary user interface configured for this purpose. At step 421, an authenticated user may navigate to a search feature (e.g., entry 535 of FIG. 5a) of a media manager application (e.g., media manager application 205a). Doing so may dynamically modify pane 503 to present various search options, such as browse subject areas (e.g., media content regarding traffic, news, sports, current events, etc., including those previously delineated), browse available content providers/sources (e.g., broadcasters, grassroots groups, public or private institutions, etc., including those previously described), search by keyword (e.g., actor, program title, publication date/time, program description, genre, rating, or any other suitable search string), and/or search by content type (e.g., media content taking the form of audio streams, video streams, pictographic content, etc.), as well as any other suitable search option.

In particular embodiments, various search options may be combined or strung together by logical operators/connectors, e.g., and, or, not, etc. Thus, search options of a media manager application may allow the user to perform complex (or Boolean) searches. Certain other embodiments enable users to implement third party search engines accessible over a data network, e.g., Google™, wherein corresponding search results may be automatically ported to the media manager application or simply "copied and pasted" when necessary.

In any case, (per step 423) the user may navigate to, for instance, the search by keyword option and launch the method via control device 209 or other suitable actuator, such as a displayed interactive button (e.g., similar to "OK" option 533). After selection, interface 500 may be dynamically modified to interface 550 (as seen in FIG. 5b). In this manner, navigation field 527 continues to indicate user implementation of the "MEDIA MANAGER" functions/options of, for instance, STB 201. Meanwhile, navigation field 529 dynamically modifies tab 531 to a plurality of tabs 551 indicating a "current" browsing path/thread. As with interface 500, tabs 531 may be labeled and made selectable so that the user can easily return to a particular function without having to restart a session. Furthermore, panes 501 and 503 adapt to panes 553 and 555, respectively.

At step 425, the user may input a suitable search term to the media manager application, via information box 557. An on-screen keyboard 559 may be provided to facilitate input procedures or other suitable input method may be employed, e.g., input via control device 209, PC 221, or other communicatively coupled end terminal 117. In the depicted embodiment, the characters "BAT" have been input into information field 557. Per step 427, the media manager application may retrieve and provide (via pane 555) a list of results corresponding to the "BAT" sequence. These results may be acquired via metadata correlation, i.e., based on available media content descriptions related to the input sequence of box 557. In certain embodiments, the list of search results may be dynamically updated in real-time as the user inputs information to box 557. Such a process enables users to efficiently narrow the list of results. Still other embodiments enable users to implement additional search methods to narrow the results. Further, header and footer fields (e.g., footer field 561) may be provided to indicate additional results.

Accordingly, the list of entries (e.g., entries 563a-563e) within pane 555 may be of varying type and may be accompanied by graphical elements to facilitate user recognition. For example, pane 555 may include one or more results (e.g., result 563a) that include an expandable list of related media content instances associated with a particular source, e.g., a video sharing site. As such, a graphical element may depict a server and folder to indicate multiple results from "AUDIO SHARING SITE." Results 563b (i.e., a video stream) and 563c (i.e., an audio stream), as well as the corresponding graphical elements, may indicate single media content instances available via particular audio/video sharing-sites.

Users may then select search results to make available via STB (e.g., STB 201). That is, a user may navigate to a particular entry using, for instance, control device 209. In turn, the media manager application may establish a link between the specified source and, for instance, MSP 111. The established link may be stored in a "MY CONTENTS" feature/option as a suitable identifier for later selection, as will be more fully described below.

Figure 6:
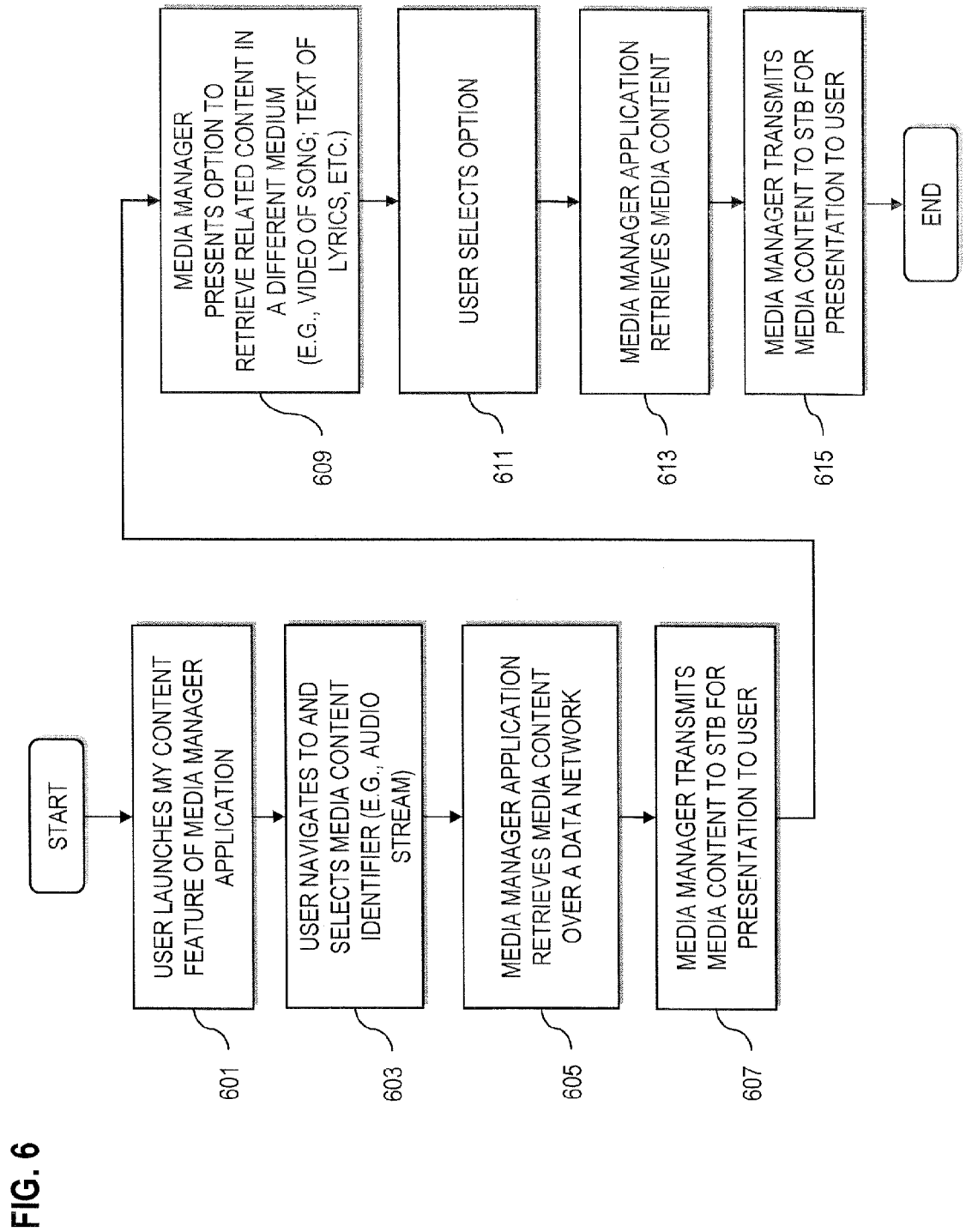
FIG. 6 is a flowchart of a process for selecting content using the set-top box of FIG. 2, according to an exemplary embodiment.
Figure 7A:
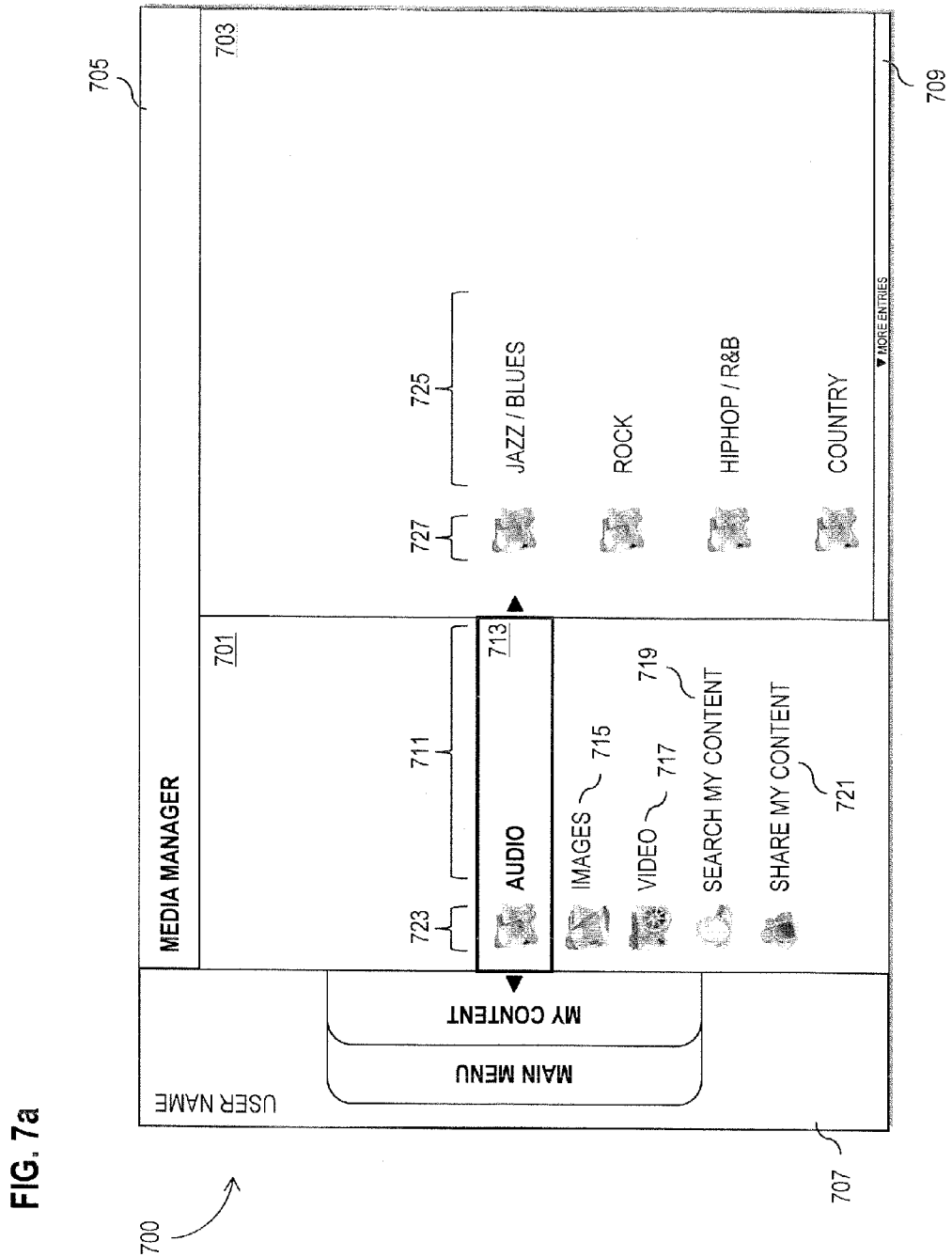
FIGS. 7a and 7b are diagrams of user interfaces utilized in the process of FIG. 6, according to exemplary embodiments.
Figure 7B:
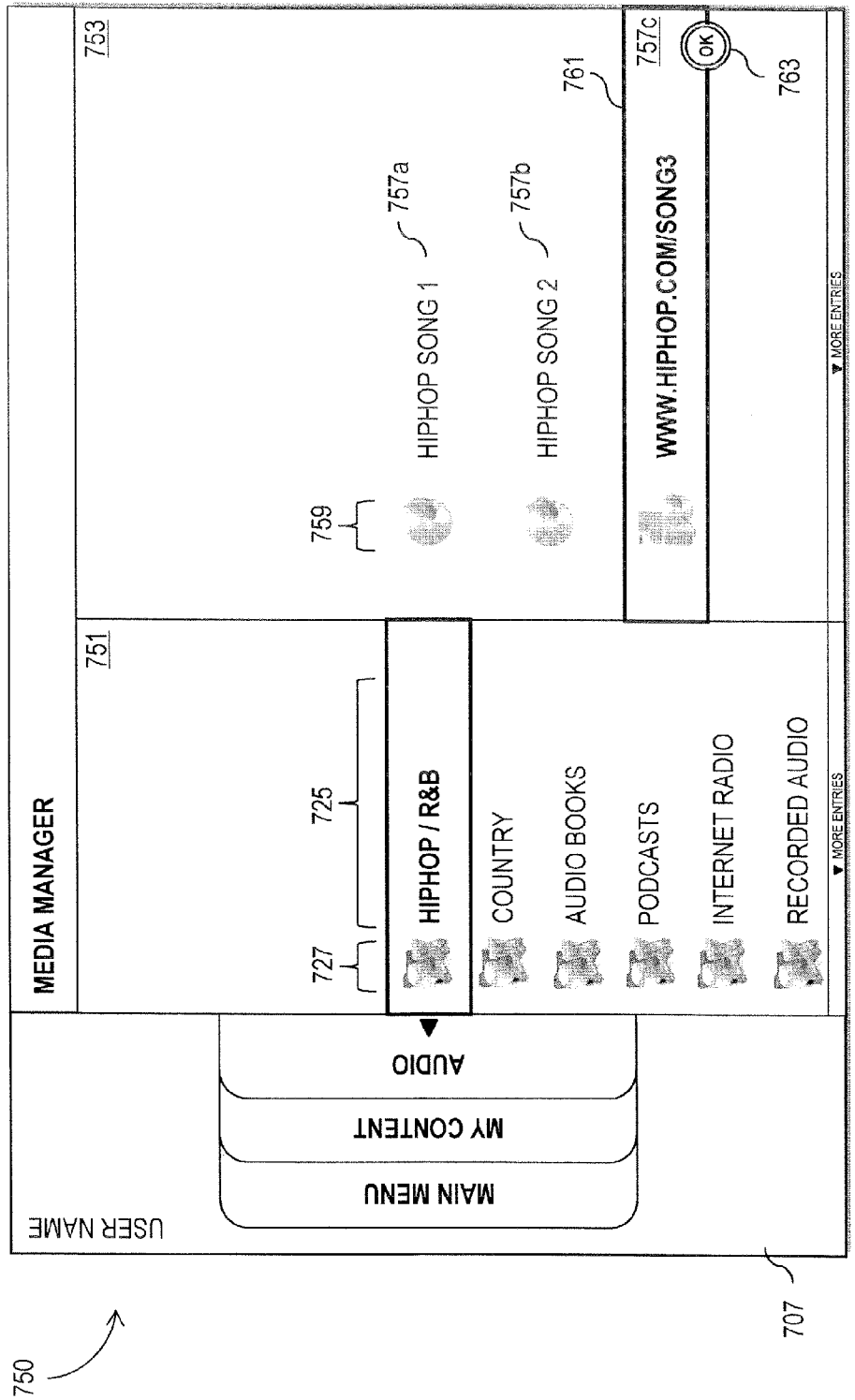

Other embodiments enable users to experience specified media content by selecting one or more identifier(s) of the content. FIG. 6 is a flowchart of a process to display and select content to experience using the set-top box of FIG. 2, according to an exemplary embodiment. FIGS. 7a and 7b are diagrams of exemplary user interfaces configured for this purpose.

At step 601, an authenticated user may navigate to a "MY CONTENT" feature/option (e.g., entry 537 of FIG. 5a) of a media manager application (e.g., media manager application 205a). As a result, pane 503 may be dynamically modified to present a plurality of features and/or options, such as audio directories, image directories, video directories, search my content features, and share my content features, as well as any other suitable feature/option, e.g., playlist features or synchronization options. In alternative embodiments, the "MY CONTENT" feature may be launched, thereby dynamically adapting interface 500 to interface 700. It is also noted that the "MY CONTENT" feature may be nested (alternatively or additionally) as an entry of main menu 300 (of FIG. 3). Moreover, selecting a "MY CONTENT" option at one interface may launch a corresponding "MY CONTENT" instance at another interface (or device), e.g., selecting entry 537 may launch a nested "MY CONTENT" instance of main menu 300.

In this manner, any of the "MY CONTENT" instances may receive and/or port data from one or more media manager applications (e.g., media manager application 205a-205c), or one or more "MY CONTENT" instances, to carry out the processes described below. Additionally (or alternatively), various "MY CONTENT" instances may be synchronized. For instance, modifications via media manager application 205c may automatically cause corresponding modifications to a "MY CONTENT" instance of STB 201. Synchronization signals may be transmitted directly between interested components (e.g., between server 119 and STB 201) or may be funneled through MSP 111. In alternative embodiments, users may be required to conduct an "UPDATE MY CONTENT" feature (via STB 201) to effectuate synchronization, e.g., by actuating a corresponding menu option, interface entry, control device button, or other like procedure. Accordingly, users may be presented with the most current media content available.

As seen in FIG. 7a, interface 700 relates to a launched "MY CONTENT" feature of a media manager application (e.g., media manager application 205a), per step 601. Interface 700 includes dynamically modified, interactive viewing panes 701 and 703. Fields 705 and 707 may be provided to facilitate macro-navigation, as previously described. Also, header and/or footer fields (e.g., footer field 709) may be provided to facilitate micro-navigation, as previously described. In this manner, pane 701 may include a plurality of features (and/or options) 711, e.g., audio directories 713, image directories 715, video directories 717, search my content features 719, and share my content features 721, as well as any other suitable feature/option, e.g., playlist features (not illustrated) or synchronization options (not illustrated). Further, a plurality of corresponding graphical elements 723 may be included to facilitate user recognition of the plurality of features 711 and/or type of media content accessible therein.

Referring back to FIG. 6, a user may navigate to a specified media content instance, per step 603, via suitable method (e.g., using control device 209). For instance, navigation to audio directory 713 may cause pane 703 to dynamically display user defined categories 725 of available media content including "JAZZ/BLUES" directories, "ROCK" directories, "HIPHOP/R&B" directories, "COUNTRY" directories, and the like. Graphical elements 727, e.g., audio file folders, may be provided to indicate further browsing capability and type of media content accessible therein. Thus, if a user navigates to and selects the "HIPHOP/R&B" directory, interface 700 may be dynamically modified to interface 750 of FIG. 7b.

In this manner, pane 751 now provides the plurality of user-defined categories 725 and corresponding graphical elements 727. The user-defined categories 725 can include different categories. This is done to further demonstrate exemplary breadth of media content accessible over a data network that can be made available to STB users. Moreover, pane 753 may provide a listing of selectable media content identifiers 757a-757c and a corresponding plurality of graphical elements 759, wherein identifiers 757a and 757b demonstrate audio content (e.g., hiphop song 1 and hiphop song 2) stored to a repository of (or accessibly by) STB 201 (e.g., memory 231). Identifier 757c illustrates audio content, hiphop song 3, that is accessible over the data network 105. Further, field 707 may be dynamically updated to correlate to a "current" browsing thread.

Fixed focus state 761 may illustrate a "currently" navigated position. As such, the user may select, for instance, audio stream identifier 757c via, for instance, control device 209, on-screen "OK" option 763, or by another suitable method. Upon selection, one or more media manager application(s) 205a-205c may retrieve (per step 605) a corresponding audio stream over, for instance, the packet-based network 105 via a previously established link. In alternative embodiments, a media manager application may indirectly acquire the media content via MSP 111, wherein MSP 111 retrieves the media content over a data network (e.g., telephony network 107).

In step 607, one or more media manager applications may transmit received media content to STB 201 (namely presentation module 235) for presentation to the user via, for instance, display 215. At this point, the selected audio stream is played, as indicated by text box 765 (in FIG. 7c). STB 201 may present the selected content to a user while it is being transmitted or may, instead, wait until the stream is completely downloaded before formatting the signal and presenting it to the user. It is also contemplated that users may create playlists of media content.

Figure 7C:
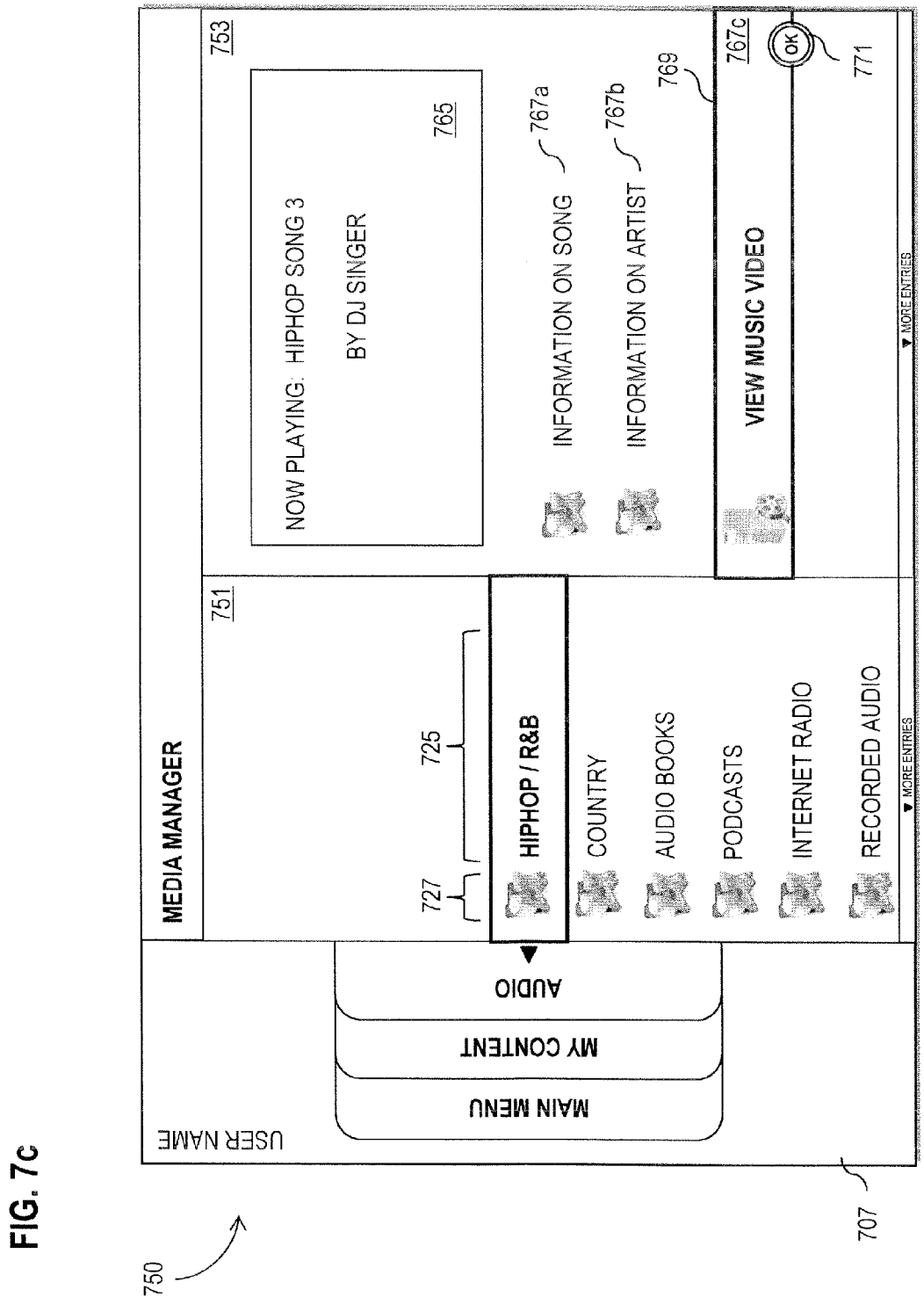

As shown in FIG. 7c, the user can then be presented with other selection options associated with identifiers 767a-767c (step 609). Identifier 767a corresponds to information about the song that is playing. Such information can include textual and/or graphical information. The user can also learn about the artist by selecting identifier 767b. Furthermore, the user is offered a capability to view a music video of the song. This option can be selected by using the highlighted box 769 in conjunction with the OK button 771. Upon selection of the video option, the medial manager application retrieves the video content and displays it to the user via the STB (steps 611-615). Alternatively, the selection can be video content about the artist, e.g., personal interview, or other footage. In this manner, the video can be played concurrently (or simultaneously) with the song (e.g., hiphop song 3).

As evident from FIG. 7c, the user can select content such as a song and then experience in the song in a different medium—e.g., music video. In another embodiment, the user can begin with viewing a video, and then be prompted with options for simply the audio and textual information about the song and artist.

The processes described herein for providing, via set-top box, access to media content may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
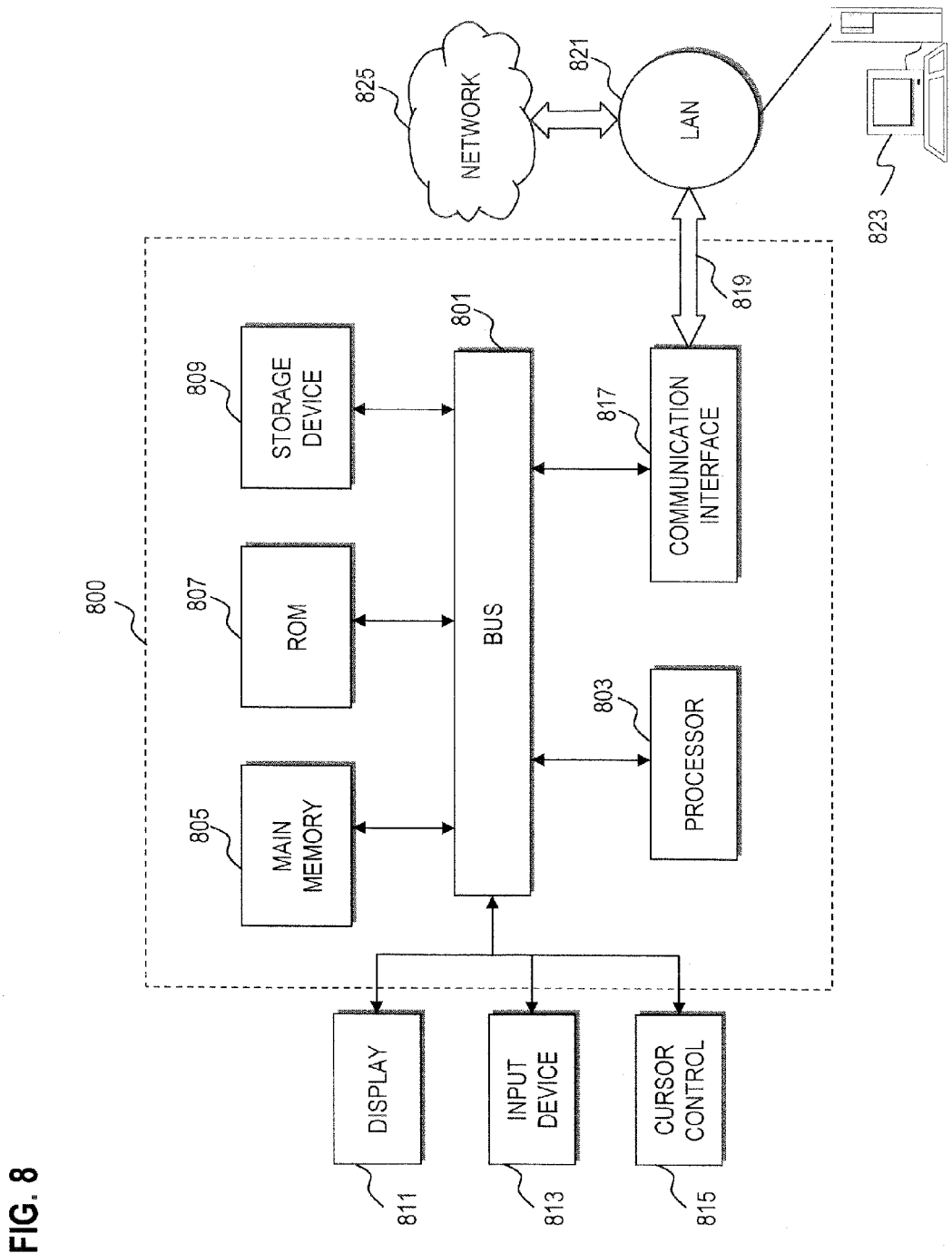
FIG. 8 is a diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the preferred embodiments have been described herein, alterations thereto, and other embodiments and implementations of the invention as set forth in the attached claims are possible. Accordingly, the scope of the invention is not limited to the description provided herein, but rather covers various modifications and equivalent arrangements.

What is claimed is:

1. A method comprising:
presenting, via a set-top box, a first media content from a TV broadcast, to a user; offering the user an option to receive a second media content from a data network in addition to the first media content, wherein the second media content relates to the first media content, and wherein the second media content derives from a source independent from the first media content;
establishing a communication link between the data network and a media service provider (MSP) to access the second media content;
identifying and authenticating, via the set-top box, a terminal of the user and the user's right to access the second media content from multiple sources by revoking an existing set of digital certificates associated with a first provider and issuing a new set of digital certificates mapped to a second provider;
retrieving, via a media manager application, the first media content presented to the user, and, upon selection by the user of the option to receive the second media content, and authenticating the terminal and the user's right to access, presenting, via the set-top box, the second media content to the user concurrently with the first media content,
wherein a user interface is displayed to the user as part of the media manager application, and
wherein the first media content is an audio stream comprising a song and the second media content is a video stream comprising a music video of the song.

2. A method according to claim 1, wherein the first media content is audio content that is retrieved by the set-top box from an audio-sharing site over a data network.

3. A method according to claim 1, further comprising:
receiving input from the user for selection of the option via the set-top box or a computing device separate from the set-top box.

4. A method according to claim 1, wherein the offering step is performed by a media manager, and wherein the offering step comprises:
offering a plurality of media content options from which the selection of the second media content is made.

5. A method according to claim 4, wherein the plurality of media content options are sourced from a plurality of network resources.

6. A method according to claim 4, wherein the media manager resides remote from the set-top box.

7. A set-top box apparatus comprising:

a processor configured to present a first media content from a TV broadcast to a user, and to offer the user an option to receive a second media content from a data network in addition to the first media content, wherein the second media content relates to the first media content, and wherein the second media content derives from a source independent from the first media content, wherein the processor is further configured to establish a communication link between the data network and a media service provider (MSP) to access the second media content, identify and authenticate a terminal of the user and the user's right to access the second media content from multiple sources by revoking an existing set of digital certificates associated with a first provider and issuing a new set of digital certificates mapped to a second provider, wherein the processor is further configured to retrieve, via a media manager application, the first media content presented to the user, and, upon selection by the user of the option to receive the second media content, and authenticating the terminal and the user's right to access, present the second media content to the user concurrently with the first media content, wherein a user interface is displayed to the user as part of the media manager application, and wherein the first media content is an audio stream comprising a song and the second media content is a video stream comprising a music video of the song.

8. An apparatus according to claim 7, wherein the first media content is audio content that is retrieved by the set-top box from an audio-sharing site over a data network.

9. An apparatus according to claim 7, further comprising:
an input interface coupled to the processor and configured to receive input from the user for selection of the option; and
a communication interface coupled to the processor and configured to alternatively receive input from the user for selection of the option from a computing device separate from the set-top box apparatus.

10. An apparatus according to claim 7, further comprising a media manager configured to offer the user a plurality of media content options from which a selection of the second media content is made.

11. A method according to claim 10, wherein the plurality of media content options are sourced from a plurality of network resources.

12. A method according to claim 10, wherein the media manager resides remote from the set-top box.

13. A set-top box apparatus comprising:
at least one processor, the at least one processor configured to communicate with a data network for retrieval, via a media manager application, of a first media content, and for retrieval of a second media content in addition to the first media content, wherein the second media content relates to the first media content, and wherein the second media content derives from a source independent from the second media content;
to identify and authenticate a terminal of a user and the user's right to access the second media content from multiple sources by revoking an existing set of digital certificates associated with a first provider and issuing a new set of digital certificates mapped to a second provider; and
to present the first media content to the user, and to prompt the user with an option to experience the second media content concurrently with the first media content wherein a user interface is displayed to the user as part of the media manager application and wherein the first media content is an audio stream and the second media content is a video stream, the audio stream being a song and the video stream being a music video of the song.

14. An apparatus according to claim 13, wherein the first media content is audio content that is retrieved by the set-top box from an audio-sharing site over the data network.

15. An apparatus according to claim 13, further comprising:
an input interface configured to receive input from the user for selection of the option.

16. An apparatus according to claim 13, wherein the at least one processor is further configured to offer the user a plurality of media content options from which a selection of the second media content is made.

17. A method comprising:
presenting, via a set-top box, a first media content to a user;
establishing a communication link between a data network and a media service provider (MSP) to access a second media content;
searching, over the data network via the set-top box, for the second media content in addition to the first media content, wherein the second media content relates to the first media content, and wherein the second media content derives from a source independent from the first media content;
identifying and authenticating, via the set-top box, a terminal of the user and the user's right to access the second media content from multiple sources by revoking an existing set of digital certificates associated with a first provider and issuing a new set of digital certificates mapped to a second provider;
receiving the second media content upon selection by the user of the option to receive the second media content, and authenticating the terminal and the user's right to access; and
presenting, via the set-top box, the second media content to the user concurrently with the first media content,
wherein a user interface is displayed to the user, the user interface configured to allow the user to seamlessly access functions of the set-top box, available media content, and one or more media manager applications, and
wherein the first media content is an audio stream and the second media content is a video stream, the audio stream being a song and the video stream being a music video of the song.

18. A method according to claim 17, wherein the second media content comprises an audio stream, and further comprising:
accessing an audio-sharing site over the data network to retrieve the audio stream.

19. A method according to claim 18, further comprising:
receiving an input specifying a Uniform Resource Locator (URL) corresponding to the audio-sharing site.

* * * * *